United States Patent
Vogt et al.

[15] 3,706,683
[45] Dec. 19, 1972

[54] CROSS-LINKED NITROGEN- AND CHLORINE-CONTAINING CELLULAR PLASTICS AND A METHOD FOR THE PREPARATION THEREOF

[72] Inventors: Herwart C. Vogt, Grosse Ile; Pauls Davis, Gibraltar, both of Mich.

[73] Assignee: BASF Wyandotte Corporation, Wyandotte, Mich.

[22] Filed: Feb. 26, 1971

[21] Appl. No.: 119,386

[52] U.S. Cl.........260/2.5 R, 260/2.5 HA, 260/2.5 E, 260/2.5 P, 260/23 EP, 260/23 XA, 260/30.6 R, 260/33.8 UA, 260/45.75 K, 260/45.75 R, 260/45.8 N, 260/45.85 R, 260/45.9 R, 260/92.8 AC, 260/94.9 H, 260/96 HA, 264/54

[51] Int. Cl...........................C08f 47/10, C08f 29/14

[58] Field of Search........260/2.5 R, 2.5 HA, 96 HA, 260/94.9 H, 92.8 AC

[56] References Cited

UNITED STATES PATENTS 3,498,934   3/1970   Kraemer et al.................. 260/2.5 HA

*Primary Examiner*—Murray Tillman
*Assistant Examiner*—Wilbert J. Briggs, Sr.
*Attorney*—Joseph D. Michaels, Bernhard R. Swick, Robert M. Phipps and Robert E. Demn

[57] ABSTRACT

Cross-linked cellular plastics having either open or closed cell structures are prepared from chloronitrosylated hydrocarbon polymers, having a chlorine content of from 0.5 to 73 percent by weight and a nitrogen content of from 0.01 to 5 percent by weight. The resulting cellular plastics possess improved physical properties.

18 Claims, No Drawings

CROSS-LINKED NITROGEN- AND CHLORINE-CONTAINING CELLULAR PLASTICS AND A METHOD FOR THE PREPARATION THEREOF

The present invention relates to cellular plastics, i.e., foams having either open or closed cell structures prepared from hydrocarbon polymers containing both chlorine and nitrogen atoms. More particularly, the invention relates to the preparation of cross-linked cellular plastics from a blowing agent and a hydrocarbon polymer containing polar groups.

It is known to use chlorine-containing polymers in the preparation of expanded materials by incorporating in the polymer a chemical blowing agent which, under the influence of heat evolves gas, whereby cells are formed and a low density product is produced. However, the prior art processes suffer several disadvantages. One major disadvantage of the prior art foams prepared from chlorine-containing hydrocarbon polymers is that the foams remain thermoplastic and, therefore, thoroughly soluble in common solvents such as benzene and carbon tetrachloride.

Now, in accordance with the subject invention, it has unexpectedly been found that infusible, insoluble, thermoset foams based on chlorine- and nitrogen-containing hydrocarbon polymers may be prepared in a one-step process by heating a chlorine- and nitrogen-containing polymer with a blowing agent at a temperature sufficient to release the gas from said blowing agent and to effect the cross-linking of the polymer. Generally, the process of the subject invention is carried out at temperatures of from 50° to 250° C., preferably from 75° to 190° C.

Any of the well-known chemical and solvent blowing agents can be used in the preparation of the foams in accordance with the subject invention. Illustrative chemical blowing agents include azobis(formamide), azodicarbonamide, diazoaminobenzene, N,N'-dinitrosopentamethylene tetramine, N,N'-dimethyl-N,N'-dinitrosoterephthalamide, p,p'-oxybis(benzenesulfonyl semi-carbazide), azobis(isobutyronitrile), p,p'-oxybis(benzenesulfonyl hydrazide), p,p'-diphenyl-bis(sulfonyl hydrazide), benzenesulfonyl hydrazide, m-benzene-bis(sulfonyl hydrazide). Illustrative solvent blowing agents include fluorocarbons such as tetrafluoromethane, bromotrifluoromethane, chlorotrifluoromethane, dibromodifluoromethane, dichlorodifluoromethane, trichlorofluoro-methane, hexafluoroethane, 1,2,2-trichloro-1,1,2-trifluoroethane, 1,1,2,2-tetrachloro-1,2-difluoroethane, 1,2-dibromo-1,1,2,2-tetrafluoroethane, 1,2,2-tribromo-1,1,2-trifluoroethane, octafluoropropane, decafluorobutane, hexafluorocyclopropane, 1,2,3-trichloro-1,2,3-trifluorocyclopropane, octafluorocyclo-butane-1,1,2-dichloro-1,2,3,3,4,4-hexafluorocyclobutane, 1,2,3,4-tetrachloro-1,2,3,4-tetrafluorocyclobutane, trichloroethylene, chloroform, carbon tetrachloride, and low boiling hydrocarbons, such as butane, pentane, hexane, and toluene. Inorganic blowing agents, such as metal halides, alkaline and alkali earth carbonates, bicarbonates, ammonium carbonates and bicarbonates may also be employed in the subject invention as well as various forms of ammonium nitrite. Accordingly, any compound which decomposes or volatilizes to yield at least one mole of gas per mole of blowing agent at a temperature of 250° C. or less can be used.

The hydrocarbon polymers containing chlorine and nitrogen atoms which are employed in the subject invention are prepared by the reaction of a hydrocarbon polymer with nitrosyl chloride or chlorine and nitric oxide, generally in the presence of a catalyst. The chloronitrosylated polymers have a chlorine content of from 0.05 to 73 percent by weight and a nitrogen content of from 0.01 to 5 percent by weight. The preparation of these polymers is more fully disclosed in our copending U.S. patent applications, Ser. Nos. 4754 and 4756, both filed on Jan. 21, 1970.

Hydrocarbon polymers which may be chloronitrosylated generally have a molecular weight from about 1,000 to 500,000, preferably from about 6,000 to 150,000. The polymers may be completely saturated or they may contain residual, reactive ethylenic unsaturation or functional groups such as halogen atoms or carbonyl, carboxyl and hydroxyl groups. Representative hydrocarbon polymers include polyolefins such as polyethylene, polypropylene, polybutylene, the higher polyalkylenes, copolymers prepared from mixtures of olefins such as poly(ethylene-propylene), chlorinated polyolefins such as chlorinated polyethylene, polystyrene, poly(methylstyrene), poly($\alpha$-methylstyrene), polybutadiene, polyisobutylene, chloroprene, butyl rubber, poly(styrene-butadiene), polysulfone, polyvinylidenechloride, polyvinylidenefluoride, vinyl halide polymers, homopolymers or copolymers, polyvinyl-chloride, vinylchloride-vinyl acetate copolymers, vinyl chloride-vinyl acetal copolymers, vinyl chloride-vinylidene chloride copolymers, vinyl chloride-acrylonitrile copolymers, vinyl chloride-1,2-ethylene dicarboxylic acid alkyl ester copolymers, such as vinyl chloride-diethyl fumarate copolymers, vinyl chloride-diethyl maleate copolymers; vinyl chloride-vinylidene chloride-acrylonitrile terpolymers, vinyl chloride-vinyl acetate-maleic anhydride terpolymers, etc. Either plastisol or plastic grade vinyl chloride polymers can be used since this invention is equally applicable to either type. In addition to the above, blends of vinyl chloride polymers with certain other polymers can be used. Exemplary polymers which can be blended with a vinyl chloride polymer are polychloroprene, butadiene-acrylonitrile copolymers, butadiene-methyl isopropenyl ketone copolymers, butadiene-vinyl pyridine copolymers, butadiene-ethyl acrylate copolymers, polyisobutylene, polyethylene, styrene-butadiene copolymers, and natural rubber. Various types of foams can be prepared from the vinyl chloride polymers described above, depending upon the specific polymer used. For example, poly(vinyl chloride) yields rigid and semi-rigid foams whereas flexible foams are obtained from poly(vinyl chloride) plastisols and the vinyl chloride copolymers.

In a preferred embodiment of the subject invention, the chloronitrosylated hydrocarbon polymer is blended with conventional compounding agents before the blowing agent is added thereto. Compounding agents such as accelerators or activators, catalysts, fillers, stabilizers, antioxidants, antiozonants, plasticizers and positive chlorine compounds may be used. Representative accelerators or activators include metal salts such as dibasic lead phosphite, tribasic lead maleate and tribasic lead sulfate; and long-chain ($C_{10}$–$C_{20}$) fatty acids such as lauric acid, palmitic acid, oleic acid and stearic acid. Mixtures of the above may also be employed. Generally, the accelerators or activators are employed in conventional amounts, e.g., from 1 to 20 parts, preferably from 5 to 15 parts, based on 100 parts by weight of polymer. Representative catalysts include free-radical initiators such as hydrogen peroxide, t-butyl peroxide, di-t-butyl peroxide, benzoyl peroxide, tertiary butyl hydroperoxide and dicumyl peroxide, and azo compounds such as azobis(isobutyronitrile). Other peroxide initiators which may be employed in the present invention include cumene hydroperoxide, dichlorobenzoyl peroxide, tertiary butyl perbenzoate, acetyl benzoyl peroxide, caprylyl peroxide, lauryl peroxide, hydroxyheptyl peroxide, methyl ethyl ketone peroxide, 1-hydroxycyclohexyl hydroperoxide-1, ditertiary butyl perphthalate, dibenzaldiperoxide, 2,2-(tertiary butyl-peroxy)butane, bis(para-bromobenzoyl)peroxide, bis(para-chlorobenzoyl)peroxide, bis(succinyl)peroxide, and bis(chloroacetyl)-peroxide. Reference is made to a book entitled *Radical Polymerization* by J. C. Bevington, (Academic Press, 1961), pages 5–28, for a detailed discussion of well-known, free-radical initiators which may be employed. Generally, from 0.1 part to 10 parts, preferably from 1 to 5 parts by weight of free-radical catalyst per 100 parts by weight of polymer will be employed.

The cross-linking reaction may also be carried out in the presence of a filler. Both reinforcing and non-reinforcing fillers may be used. Representative of such fillers are carbon black, titanium dioxide, precipitated silica, calcium carbonate, clay, and talc.

In addition to the above-mentioned compounding agents, any other conventional compounding agents may be employed. These agents may be employed in conventional, non-critical amounts, e.g., from 3 to 50 parts by weight or more per 100 parts by weight of the polymer. Illustrative agents include stabilizers, antioxidants, antiozonants, plasticizers and positive chlorine compounds. Representative stabilizers include organo tin compounds, barium cadmium phosphite, epoxidized soybean oil, dibasic lead phthalate, dibasic lead stearate and dibasic lead succinate. Representative antioxidants and antiozonants include hindered phenols, such as 2,6-di-tert-butyl-para-cresol; heterocyclics, such as the phenothiazines; large variety of amines, such as N,N'-di-$\beta$-naphthly-p-phenylene diamine; esters, such as n-octadecyl $\beta$-(3,5-di-t-butyl-4-hydroxyphenyl)propionate; sulfur containing compounds, such as 4,4'-thiobis(3-methyl-6-t-butyl phenol). In addition, such classes as mercaptans, sulfides, disulfides, mercaptals, dithiocarbamates, dithiophosphates, trithiophosphites and phosphite esters of alkyl, aryl, and mixed types may be used. Representative plasticizers include chlorinated diphenyl, dioctyl phthalate, dioctyl sebacate, dioctyl adipate, tricresyl phosphate and epoxy higher esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

As discussed above, in preparing foams in accordance with the subject invention, the chloronitrosylated hydrocarbon polymer is first blended with select additives and a blowing agent. Any desired means can be used to bring about this blending. If desired, a two-roll rubber mill or a Banbury mixer can be employed. A convenient method for forming the desired expandable blend is to mix the starting polymer with the desired additives, pass the mixture through an extruder, chop the extruded material into pellets and then soak the pellets in the solvent blowing agent until the desired amount of the latter has been absorbed. The blowing agent can be mixed with a diluent, which can also contain a stabilizer or other modifier for the pretreated chlorine containing polymer, and then the polymer in finely divided form can be added and mixed into a slurry. On evaporation of the diluent an intimate mixture of the polymer and blowing agent is obtained.

The foams of the present invention can also be prepared by absorbing a liquid blowing agent in a chloronitrosylated hydrocarbon polymer and then expanding the blowing agent into a gas, thereby forming cells within the polymer. For the best results, the chloronitrosylated hydrocarbon polymer is impregnated with blowing agent at an elevated temperature under sufficient pressure to maintain the blowing agent in at least a partially liquefied state, and then the polymer is directly foamed by releasing the pressure at a temperature above the boiling point of the blowing agent.

The chloronitrosylated hydrocarbon polymer particles, impregnated with blowing agent by the absorption process, can be made into foam in a number of ways. In one process, the particles are fed through an extruder in which the extrusion cylinder and/or stock screw are equipped with heating means, and as the chloronitrosylated hydrocarbon polymer is advanced through the extrusion cylinder, it is converted to a viscous melt having a temperature above the boiling point of the blowing agent absorbed therein. While the polymer is confined within the extrusion cylinder, the blowing agent cannot expand, and heating the blowing agent above its boiling point generates high pressure within the extruder. When the hot composition is forced through the extruder head into a zone of lower pressure, the blowing agent expands the resin forming a continuous log cellular polymeric material. The size and shape of this log are, of course, a function of the extruder die.

Another method of preparing the cellular product from the above-described expandable polymer particles is by molding. A convenient means of accomplishing this is to fill partially a mold with a sufficient quantity of expandable particles to fill the mold after foaming. After placing the particles in the mold, they are heated to a temperature above the boiling point of the blowing agent absorbed therein and above the softening point of the polymer to thereby expand the particles and form a cellular product having the shape of the mold. The mold is then cooled prior to removal of the molded product.

The following examples illustrate the invention. All parts are by weight unless otherwise indicated. In the examples which follow, the percent chlorine was determined by the Mohr Chlorine Procedure and the percent nitrogen was determined by the Dumas Nitrogen Procedure. The physical properties of the cross-linked cellular polymers were determining according to Standard ASTM Procedures.

EXAMPLE I

A. Preparation of Chloronitrosylated, Chlorinated Polyethylene

A reaction vessel equipped with a thermometer, stirrer, condenser and heat exchange means was charged with 29,520 parts of trichlorofluoromethane and 4,000 parts of chlorinated polyethylene having a chlorine content of 27 percent, a melt flow index of 0.1 gram per 10 minutes and a density of 1.1. Under a nitrogen atmosphere, the charge was heated to 24° C. at which temperature refluxing occurred. While maintaining the charge at this temperature, 500 parts of nitrosyl chloride was passed through the reaction vessel in the presence of a quartz Hanovia 500-watt lamp for a period of 10 hours. After the end of the 10-hour period, the reaction mixture was cooled to room temperature and the product isolated by filtration and dried under ambient conditions to constant weight. Analysis of the fine, free-flowing product indicated 28 percent chlorine and 0.1 percent nitrogen.

B. Flexible Foam Prepared from the Above-described Chloronitrosylated, Chlorinated Polyethylene To 100 parts of the chloronitrosylated, chlorinated polyethylene powder prepared above were added 5 parts of magnesium oxide, 20 parts of a chlorinated biphenyl plasticizer containing 42 percent chlorine (AROCLOR 1242) and 7.5 parts of azodi-carbonamide. One hundred parts of the resulting composition was charged to a 1 inch × 6 inch × 6 inch chromeplated mold for one hour at 300° F. under 60,000 pounds of pressure. A cross-linked, foam product was removed from the mold while hot and exhibited the following physical properties:

| | |
|---|---|
| Section Density, lbs/ft$^3$ | 11.43 |
| Tensile Strength, psi | 60 |
| Elongation, % | 160 |
| Graves Tear, pi | 12.2 |
| Bashore Resilience | 36 |
| 50% Compression Set, % Set | |
| ASTM 1565 | 80.0 |
| ASTM 1564 | 90.6 |
| Oxygen Index | 22.3 |
| Solubility, boiling chlorobenzene | Insoluble |

EXAMPLE II

This example illustrates the preparation of a flexible foam from the chloronitrosylated, chlorinated polyethylene, described in Example I, employing an inorganic blowing agent. To 100 parts of the polymer, 5 parts of magnesium oxide and twenty parts of a chlorinated biphenyl plasticizer having 42 percent chlorine was added 7.5 parts of sodium bicarbonate. The mixture was then sheeted on a cold rubber mill. One hundred parts of the sheeted polymer mixture was molded in a ¼ inch × 6 inch × 6 inch mold at 300° F. for 1 hour and the foamed product was removed from the mold while hot. The cross-linked foam exhibited the following physical properties:

| | |
|---|---|
| Section Density, lbs/ft$^3$ | 19.57 |
| Tensile Strength, psi | 206 |
| Elongation, % | 110 |
| Graves Tear, pi | 36.8 |
| Bashore Resilience | 20 |
| 50% Compression Set, % Set | |
| ASTM 1565 | 68.0 |
| ASTM 1564 | 87.5 |
| Oxygen Index | 23.0 |
| Solubility, boiling chlorobenzene | Insoluble |

Twenty-five parts of the sheeted polymer mixture was molded in a ⅝ inch × 6 inch × 6 inch mold at 300° F. for 1 hour and the foamed product was removed from the mold while hot. The cross-linked foam exhibited the following physical properties:

| | |
|---|---|
| Section Density, lbs/ft$^3$ | 25.0 |
| Tensile STrength, psi | 280 |
| Elongation, % | 90 |
| Graves Tear, pi | 73.3 |
| Bashore Resilience | 19 |
| 50% Compression Set, % Set | |
| ASTM 1565 | 60.0 |
| ASTM 1564 | 90.5 |
| Oxygen Index | 23.0 |
| Solubility, boiling chlorobenzene | Insoluble |

EXAMPLES III–IX

Following the procedure described in Example I, several foams were prepared from the chloronitrosylated, chlorinated polyethylene described in Example I. Details of the preparations and physical properties of the resulting foams are presented in Table I. All foams were prepared in ¼ inch × 6 inch × 6 inch molds at 150° C. for 1 hour. In Examples III and VI–IX, 80 parts of compounded polymer were charged into the mold. In Examples IV and V, 60 parts and 100 parts, respectively, were charged into the mold.

TABLE I

| Example | III | IV | V | VI | VII | VIII | IX |
|---|---|---|---|---|---|---|---|
| Polymer, parts | 100 | 100 | 100 | 100 | 100 | 100 | 100 |
| Magnesium oxide, parts | 5 | 5 | 5 | 5 | 5 | 5 | 5 |
| Chlorinated biphenyl (42% chlorine), parts | 40 | | 20 | 20 | 20 | | |
| Tricresyl phosphate, parts | | | | | | 20 | |
| Dioctylphthalate, parts | | | | | | | 20 |
| Azodicarbonamide, parts | 10 | 7.5 | 15 | | | | |
| p,p'-Oxybis(benzenesulfonyl hydrazide), parts | | | | | 7.5 | 7.5 | 7.5 |
| Di-N-nitrosopentamethylene tetramine, parts | | | | 7.5 | | | |

TABLE I – Continued

| Example | III | IV | V | VI | VII | VIII | IX |
|---|---|---|---|---|---|---|---|
| Physical properties: | | | | | | | |
| Section density, lbs./ft.$^3$ | 13.77 | 21.56 | 19.92 | 9.60 | 9.59 | 30.1 | 18.1 |
| Tensile strength, p.s.i. | 89 | 206 | 112 | 56 | 71 | 173 | 114 |
| Elongation, percent | 130 | 65 | 60 | 100 | 115 | 110 | 110 |
| Graves tear, pi | 19.8 | 44.0 | 17.6 | 13.6 | 16.2 | 49.6 | 44.6 |
| Bashore resilience | 34 | 22 | 16 | 39 | 35 | 20 | 27 |
| 50% compression set, percent set: | | | | | | | |
| ASTM 1565 | 63.2 | 54.9 | 47.2 | 80.8 | 85.7 | 51.1 | 49.5 |
| ASTM 1564 | 95.1 | 76.6 | 98.0 | 95.1 | 94.2 | 93.3 | 82.0 |
| Oxygen index | 22.3 | 22.3 | 22.3 | 23.0 | 23.0 | 24.1 | 21.5 |
| Solubility, boiling chlorobenzene | Insoluble | Insoluble | Insoluble | Insoluble | Insoluble | Insoluble | Insoluble |

EXAMPLES X–XIII

A. Preparation of Chloronitrosylated Polyethylene

A reaction vessel equipped with a thermometer, stirrer, condenser and heat exchange means was charged with 2,952 parts of trichlorofluoromethane and 402 parts of polyethylene having a molecular weight of about 60,000, a melt index of 20 and a density of 0.926. Under a nitrogen atmosphere, the charge was heated to 24° C. at which temperature refluxing occurred. While maintaining the charge at this temperature, 20 parts of nitrosyl chloride was passed through the reaction vessel in the presence of sunlight for a total period of 24 hours. After the end of the 24-hour period, the reaction mixture was cooled to room temperature and the product isolated by filtration and dried under ambient conditions to constant weight. Analysis of the fine, free-flowing product indicated 3.5 percent chlorine and 0.02 percent nitrogen.

Following the procedure described in Example I, four foams were prepared from the above-described chloronitrosylated polyethylene. Details of the preparations and physical properties of the foams are presented in Table II. In each example, 100 parts of the milled and sheeted polymer mixture was charged to a mold for 1 hour at 300° F. under 60,000 pounds of pressure.

TABLE II

| Example: | X | XI | XII | XIII |
|---|---|---|---|---|
| polymer, parts | 100 | 100 | 100 | 100 |
| magnesium oxide, parts | 5 | 5 | 5 | 5 |
| dicumylperoxide, parts | 2 | | | 2 |
| azodicarbonamide, parts | | 7.5 | | |
| p,p'-oxybis(ben-zenesulfonyl hy-drazide), parts | 7.5 | | 7.5 | 7.5 |
| physical properties | | | | |
| section density, lbs/ft$^3$ | 50.1 | 25.7 | 38.1 | 19.4 |
| tensile strength, psi | 263 | 354 | 1530 | 1455 |
| elongation % | 28 | 5 | 10 | 63 |
| graves tear, pi | 41 | 59 | 120 | 221 |
| bashore resilience | 27 | 30 | 28 | 35 |
| 50% compression set, % set | | | | |
| ASTM 1565 | 50.5 | 54.2 | 65.4 | 55.0 |
| ASTM 1564 | 65.6 | 78.7 | 68.4 | 73.3 |
| oxygen index | 17.67 | 19.94 | 20.14 | 17.25 |
| solubility, boiling chlorobenzene | insoluble | insoluble | insoluble | insoluble |

EXAMPLES XIV–XVI

A. Preparation of Chloronitrosylated, Chlorinated Polyethylene

A reaction vessel equipped with a thermometer, stirrer, condenser and heat exchange means was charged with 8,856 parts of trichlorofluoromethane and 2,000 parts of chlorinated polyethylene having a chlorine content of 48 percent, less than 2 percent residual crystallinity and a bulk density of 28 lbs/ft$^3$. Under a nitrogen atmosphere, the charge was heated to 24° C. at which temperature refluxing occurred. While maintaining the charge at this temperature, 118 parts of nitrosyl chloride was passed through the reaction vessel in the presence of a quartz Hanovia 500-watt lamp for a period of 64 hours. After the end of this period, the reaction mixture was cooled to room temperature and the product isolated by filtration and dried under ambient conditions to constant weight. Analysis of the fine, free-flowing product indicated 49.9 percent chlorine and 0.05 percent nitrogen.

Following the procedure described in Example I, three foams were prepared from the above-described chloronitrosylated, chlorinated polyethylene. Details of the preparations and physical properties of the foams are presented in Table III. In each example, 100 parts of the milled and sheeted polymer mixture was charged to a mold for 1 hour at 300° F. under 60,000 pounds of pressure.

TABLE III

| Example: | XIV | XV | XVI |
|---|---|---|---|
| Polymer, parts | 100 | 100 | 100 |
| magnesium oxide, parts | 5 | 5 | 5 |
| tricresyl phosphate, parts | — | — | 20 |
| azodicarbonamide, parts | 7.5 | — | 7.5 |
| p,p'-oxybis(benzenesulfonyl hydrazide), parts | — | 7.5 | — |
| physical properties | | | |
| Section Density, lbs/ft$^3$ | 23.7 | 49.5 | 50.1 |
| Tensile Strength, psi | 840 | 181 | 240 |
| Elongation, % | 295 | 423 | 435 |
| Graves Tear, pi | 164 | 40 | 59 |
| Bashore Resilience | 16 | 0 | 0 |
| 50% Compression Set, % Set | | | |
| ASTM 1565 | 53.5 | 101.4 | 99.2 |
| ASTM 1564 | 86.7 | 115.1 | 96.1 |
| Oxygen Index | 35.11 | 35.77 | 36.41 |
| Solubility, boiling chlorobenzene | insoluble | insoluble | insoluble |

EXAMPLES XVII AND XVIII

A. Preparation of Chloronitrosylated, Chlorinated Polypropylene

A reaction vessel equipped as described in Example I was charged with 1,565 parts of 1,1,2-trichloro-1,2,2-trifluoro-ethane and 120 parts of polypropylene having a melt flow rate of 12 grams per 10 minutes and a density of 0.904. Under a nitrogen atmosphere, the charge was heated to 48° C. at which temperature refluxing occurred. While maintaining the charge at this temperature, chlorine has was introduced into the reaction vessel in the presence of a quartz Hanovia 500-watt lamp for a period of 2 hours. While maintaining the charge at this temperature, 15 parts of nitrosyl chloride was passed through the reaction vessel in the presence of a quartz Hanovia 500-watt lamp for a period of 8 hours.

After the end of the reaction period, the reaction mixture was cooled to room temperature. The product was isolated by filtration and dried under ambient conditions to constant weight. Analysis of the fine, free-flowing product indicated 23.6 percent chlorine and 0.06 percent nitrogen.

B. Flexible Foams Prepared from the Above-Described Chloronitrosylated, Chlorinated Polypropylene Following the procedure described in Example I, two foams were prepared from the above-described chloronitrosylated, chlorinated polypropylene. Details of the preparations and physical properties of the foams are presented in Table IV. In each example, 50 parts of the milled and sheeted polymer mixture was charged to a mold for 1 hour at 300° F. under 60,000 pounds of pressure.

TABLE IV

| Example: | XVII | XVIII |
| --- | --- | --- |
| Polymer, parts | 50 | 50 |
| Magnesium Oxide, parts | 2.5 | 2.5 |
| Dicumyl Peroxide, parts | 1 | — |
| Azodicarbonamide, parts | — | 4 |
| p,p'-oxybis(benzenesulfonyl hydrazide), parts | 4 | — |
| Physical Properties | | |
| Section Density, lbs/ft³ | 21.2 | 36.4 |
| Tensile Strength, psi | 969 | 1405 |
| Elongation, % | 6 | 12 |
| Graves Tear, pi | 91 | 59 |
| Bashore Resilience | 27 | 34 |
| 50% Compression Set, % Set | | |
| ASTM 1565 | 65.2 | 57.8 |
| ASTM 1564 | 96.6 | 78.1 |
| Oxygen Index | 22.1 | 21.8 |
| Solubility, boiling chlorobenzene | Insoluble | Insoluble |

EXAMPLES XIX AND XX

A. Preparation of Chloronitrosylated, Chlorinated Polypropylene

A reaction vessel equipped as described in Example I was charged with 1,565 parts of trichlorofluoromethane and 120 parts of polypropylene having a melt flow rate of 12 grams per 10 minutes and a density of 0.904. Under a nitrogen atmosphere, the charge was heated to 24° C. at which temperature refluxing occurred. While maintaining the charge at this temperature, chlorine gas was introduced into the reaction vessel in the presence of a quartz Hanovia 500-watt lamp for a period of 5 hours. While maintaining the charge at this temperature, 20 parts of nitrosyl chloride was passed through the reaction vessel in the presence of a quartz Hanovia 500-watt lamp for a period of 7 hours. After the end of the reaction period, the reaction mixture was cooled to room temperature. The product was isolated by filtration and dried under ambient conditions to constant weight. Analysis of the fine, free-flowing product indicated 33.74 percent chlorine and 0.05 percent nitrogen.

B. Flexible Foams Prepared from the Above-Described Chloronitrosylated, Chlorinated Polypropylene Following the procedure described in Example I, two foams were prepared from the above-described chloronitrosylated, chlorinated polypropylene. Details of the preparations and physical properties of the foams are presented in Table V. In each example, 50 parts of the milled and sheeted polymer mixture was charged to a mold for 1 hour at 300° F. under 60,000 pounds of pressure.

TABLE V

| Example: | XIX | XX |
| --- | --- | --- |
| Polymer, parts | 50 | 50 |
| Magnesium Oxide, parts | 2.5 | 2.5 |
| Dicumyl Peroxide, parts | — | 1 |
| Azodicarbonamide, parts | — | 4 |
| p,p'-oxybis(benzenesulfonyl hydrazide), parts | 4 | — |
| Physical Properties | | |
| Section Density, lbs/ft³ | 25.9 | 25.0 |
| Tensile Strength, psi | 1320 | 1112 |
| Elongation, % | 10 | 21 |
| Graves Tear, pi | 80 | 63 |
| Bashore Resilience | 21 | 28 |
| 50% Compression Set, % Set | | |
| ASTM 1565 | 40.1 | 80.5 |
| ASTM 1564 | 84.2 | 96.0 |
| Oxygen Index | 24.1 | 22.8 |
| Solubility, boiling chlorobenzene | Insoluble | Insoluble |

EXAMPLE XXI

A. Preparation of Chloronitrosylated, Chlorinated Polyethylene

A reaction vessel equipped with a thermometer, stirrer, condenser and heat exchange means was charged with 31,200 parts of 1,1,2-trichloro-1,2,2-trifluoromethane and 4,000 parts of chlorinated polyethylene having a chlorine content of 36 percent, less than 2 percent residual crystallinity and a bulk density of 28 lbs/ft³. Under a nitrogen atmosphere, the charge was heated to 29° C. While maintaining the charge at 29° C., 412 parts of nitrosyl chloride was passed through the reaction vessel in the presence of a quartz Hanovia 500-watt lamp for a period of 7 hours. After the end of this period, the reaction mixture was cooled to room temperature and the product isolated by filtration and dried under ambient conditions to constant weight. Analysis of the fine, free-flowing product indicated 38.2 percent chlorine and 0.07 percent nitrogen.

B. Flexible Foam Prepared from the Above-Described Chloronitrosylated, Chlorinated Polyethylene by Extrusion Technique A dry blend was prepared from 100 parts of the chloronitrosylated, chlorinated polyethylene described above, 5 parts of magnesium oxide, 7.5 parts of p,p'-oxybis(benzenesulfonyl hydrazide) and 20 parts of tricresylphosphate. This resulting composition was charged into a single screw, low compression, table model laboratory plastic extruder, manufactured by the Wayne Machine & Die Company, having an L/D ratio of 20:1, a screw diameter of ¾ inch and screw speed of 50 to 80 r.p.m. The extruder is heated electrically by resistance heaters and the hold-up time in the extruder is 3 to 5 minutes. The extrudate was a cellular material, approximately three times the volume of a similar solid extrudate and was insoluble in boiling chlorobenzene indicating cross-linking. The sample was self-extinguishing.

EXAMPLE XXII

A. Preparation of Chloronitrosylated, Chlorinated Polyethylene

A reaction vessel equipped with a thermometer, stirrer, condenser and heat exchange means was charged with 31,200 parts of 1,1,2-trichloro-1,2,2-trifluoromethane and 4,000 parts of chlorinated polyethylene having a chlorine content of 36 percent, less than 2 percent residual crystallinity and a bulk density of 28 lbs/ft$^3$. Under a nitrogen atmosphere, the charge was heated to 29° C. While maintaining the charge at 29° C., 412 parts of nitrosyl chloride was passed through the reaction vessel in the presence of a quartz Hanovia 500-watt lamp for a period of 7 hours. After the end of this period, the reaction mixture was cooled to room temperature and the product isolated by filtration and dried under ambient conditions to constant weight. Analysis of the fine, free-flowing product indicated 38.2 percent chlorine and 0.07 percent nitrogen.

B. Flexible Foam Prepared from the Above-Described Chloronitrosylated, Chlorinated Polyethylene by Fluorocarbon Blowing Agent Process One hundred parts of the chloronitrosylated, chlorinated polyethylene described above and 295 parts of trichlorofluoro-methane were charged into a stainless steel bomb, sealed and heated for 60 minutes at 100° C. The bomb was cooled to room temperature before being opened. The swollen crumb was patted dry with absorbent paper and had increased in weight to 235 parts, indicating that 135 parts of fluorocarbon had been absorbed. Twenty-five parts of this swollen crumb was pressed between Mylar sheets at 300° F. at 10 tons ram pressure for 10 minutes to yield a cellular elastomer which was insoluble in boiling chlorobenzene. Physical properties of the foam are presented below:

| | |
|---|---|
| Tensile Strength, psi | 630 |
| 300% Modulus, psi | 550 |
| 100% Modulus, psi | 190 |
| Elongation, % | 340 |
| Graves Tear, pi | 158 |
| Compression Set, % Set ASTM 1564 | 113.5 |
| Density, lbs/ft$^3$ | 76.2 |
| Solubility, boiling chlorobenzene | Insoluble |

What is claimed is:

1. A cross-linked cellular plastic obtained by heating at a temperature from 50° to 250° C. in the presence of a blowing agent a chloronitrosylated polymer selected from the group consisting of polyolefins and chlorinated polyolefins, said chloronitrosylated polymer having a chlorine content of from 0.05 to 73 percent by weight and a nitrogen content of from 0.01 to 5 percent by weight.

2. The cellular plastic of claim 1 wherein the chloronitrosylated polymer is chloronitrosylated polyethylene.

3. The cellular plastic of claim 1 wherein the chloronitrosylated polymer is chloronitrosylated, chlorinated polyethylene.

4. The cellular plastic of claim 1 wherein the blowing agent is azodicarbonamide.

5. The cellular plastic of claim 1 wherein the blowing agent is p,p'-oxybis(benzenesulfonly hydrazide).

6. The cellular plastic of claim 1 wherein heating occurs in the presence of an accelerator.

7. The cellular plastic of claim 6 wherein the accelerator is magnesium oxide.

8. The cellular plastic claim 1 wherein heating occurs in the presence of a plasticizer.

9. The cellular plastic of claim 8 wherein the plasticizer is selected from the group consisting of chlorinated biphenyl, dioctylphthalate and tricresylphosphate.

10. A process for the preparation of a cross-linked cellular plastic comprising heating at a temperature of from 50° to 250° C. in the presence of a blowing agent a chloronitrosylated polymer selected from the group consisting of polyolefins and chlorinated polyolefins and having a chlorine content of from 0.05 to 73 percent by weight and a nitrogen content of from 0.01 to 5 percent by weight.

11. The process of claim 10 wherein the chloronitrosylated polymer is chloronitrosylated polyethylene.

12. The process of claim 10 wherein the chloronitrosylated polymer is chloronitrosylated, chlorinated polyethylene.

13. The process of claim 10 wherein the blowing agent is azodicarbonamide.

14. The process of claim 10 wherein the blowing agent is p,p'-oxybis(benzensulfonly hydrazide).

15. The process of claim 10 wherein heating occurs in the presence of an accelerator.

16. The process of claim 10 wherein the accelerator is magnesium oxide.

17. The process of claim 10 wherein heating occurs in the presence of a plasticizer.

18. The process of claim 17 wherein the plasticizer is selected from the group consisting of chlorinated biphenyl, dioctylphthalate and tricresylphosphate.

* * * * *